United States Patent [19]

Church et al.

[11] Patent Number: 5,710,468

[45] Date of Patent: Jan. 20, 1998

[54] END FRAME ASSEMBLY

[75] Inventors: Ralph E. Church; Richard W. Shuler, both of Fort Wayne, Ind.

[73] Assignee: General Electric Company, Fort Wayne, Ind.

[21] Appl. No.: 518,256

[22] Filed: Aug. 23, 1995

[51] Int. Cl.$^6$ .................. H02K 5/15; H02K 5/16
[52] U.S. Cl. .................. 310/90; 310/89; 310/90; 310/91; 384/204; 384/206; 384/213; 384/214
[58] Field of Search ................ 310/89, 90, 91; 384/204, 206, 213, 214

[56] References Cited

U.S. PATENT DOCUMENTS

| | | | |
|---|---|---|---|
| 3,002,794 | 10/1961 | Bluemink | 310/90 |
| 3,013,167 | 12/1961 | Bobula | 310/90 |
| 3,319,098 | 5/1967 | Hartman | 310/90 |
| 3,320,660 | 5/1967 | Otto | 310/90 |
| 3,391,290 | 7/1968 | Hahndorf et al. | 310/90 |
| 3,419,318 | 12/1968 | Harter | 310/90 |
| 3,420,335 | 1/1969 | Dochterman | 310/90 |
| 3,434,765 | 3/1969 | Abel | 310/90 |
| 3,625,577 | 12/1971 | Coleman | 310/90 |
| 3,649,092 | 3/1972 | Coleman | 310/90 |
| 3,661,433 | 5/1972 | Schuster | 310/90 |
| 3,727,996 | 4/1973 | Davich | 310/90 |
| 3,794,869 | 2/1974 | Apostoleris | 310/90 |
| 3,872,691 | 3/1975 | Hildebrandt | 310/90 |
| 3,885,176 | 5/1975 | Cunningham | 310/90 |
| 3,941,438 | 3/1976 | Charlton | 310/90 |
| 3,966,278 | 6/1976 | Lewis | 310/90 |
| 3,997,805 | 12/1976 | Dochterman | 310/90 |
| 4,008,928 | 2/1977 | Abel | 310/90 |
| 4,055,370 | 10/1977 | Cunningham | 310/90 |
| 4,090,749 | 5/1978 | Daniels | 310/90 |
| 4,170,057 | 10/1979 | Roddy et al. | 310/90 |
| 4,186,319 | 1/1980 | Dochterman | 310/90 |
| 4,209,722 | 6/1980 | Peachee, Jr. | 310/90 |
| 4,215,285 | 7/1980 | Lewis | 310/90 |
| 4,245,870 | 1/1981 | Punshon et al. | 310/90 |
| 4,250,417 | 2/1981 | Arnold | 310/90 |
| 4,308,478 | 12/1981 | Mertz | 310/90 |
| 4,348,791 | 9/1982 | Tomson | 310/90 |
| 4,361,953 | 12/1982 | Peachee | 310/90 |
| 4,362,342 | 12/1982 | Bushor et al. | 310/90 |
| 4,409,714 | 10/1983 | Cunningham | 310/90 |
| 4,438,359 | 3/1984 | Royer | 310/90 |
| 4,456,845 | 6/1984 | Cunningham | 310/90 |
| 4,521,953 | 6/1985 | King et al. | 310/90 |
| 4,565,937 | 1/1986 | Uhen | 310/90 |
| 4,635,352 | 1/1987 | Uhen | 310/90 |
| 4,645,361 | 2/1987 | Lakin | 310/90 |
| 4,670,677 | 6/1987 | Snider et al. | 310/90 |
| 4,758,755 | 7/1988 | Sherman et al. | 310/90 |
| 4,806,025 | 2/1989 | Kamiyama et al. | 310/90 |
| 4,883,408 | 11/1989 | Borcherding | 310/90 |
| 4,900,957 | 2/1990 | Barker et al. | 310/90 |
| 4,910,424 | 3/1990 | Boircherding | 310/90 |
| 4,972,113 | 11/1990 | Newberg | 310/90 |
| 5,035,043 | 7/1991 | Newberg | 310/90 |
| 5,113,104 | 5/1992 | Blaettner et al. | 310/90 |

*Primary Examiner*—Thomas M. Dougherty
*Assistant Examiner*—Karl Eizo Tamai
*Attorney, Agent, or Firm*—Wayne O. Traynham

[57] ABSTRACT

An end frame assembly for an electric motor is described. In one embodiment, the assembly includes an endshield, a bearing, an oil wick, and an oil well cover. The oil well cover has at least one endshield engagement tang for aligning with and being secured within an oil well cover engagement opening in the endshield and at least one bearing alignment finger for assisting in maintaining the bearing oriented with respect to a rotor shaft.

37 Claims, 3 Drawing Sheets

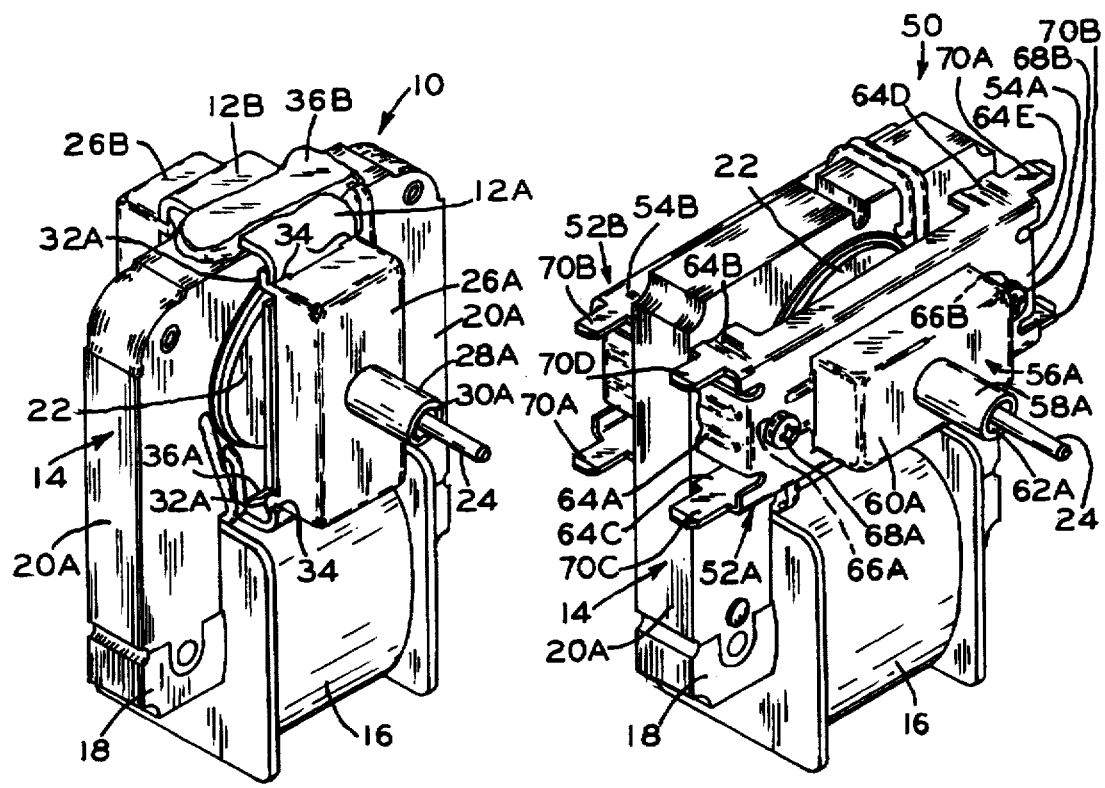
FIG_1 PRIOR ART
FIG_2
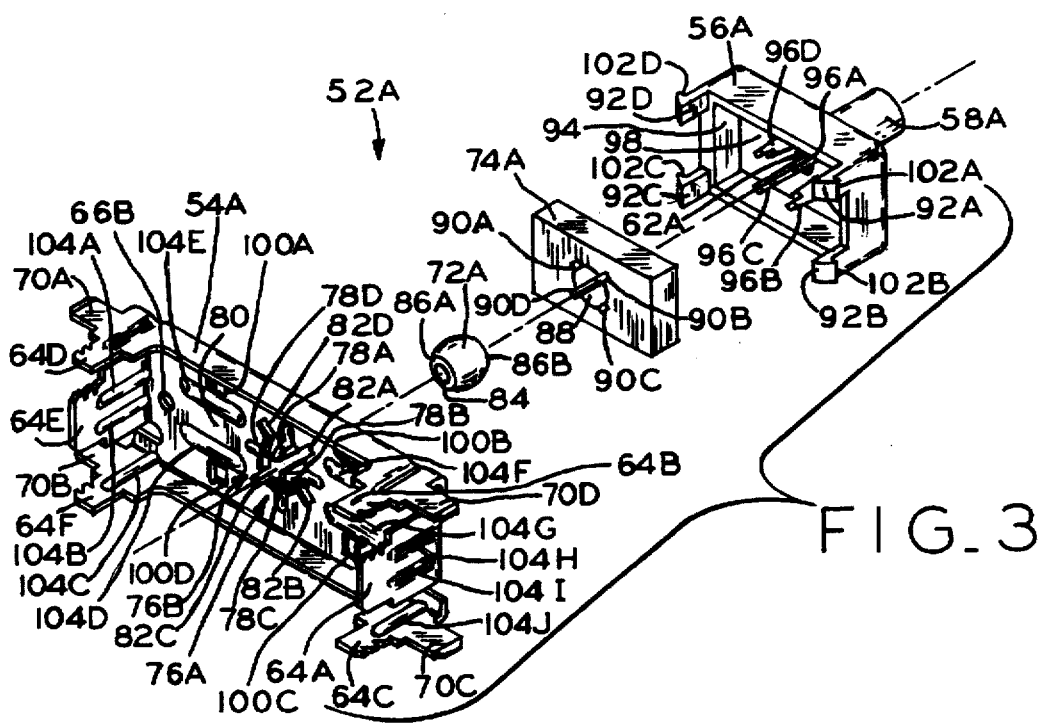
FIG_3

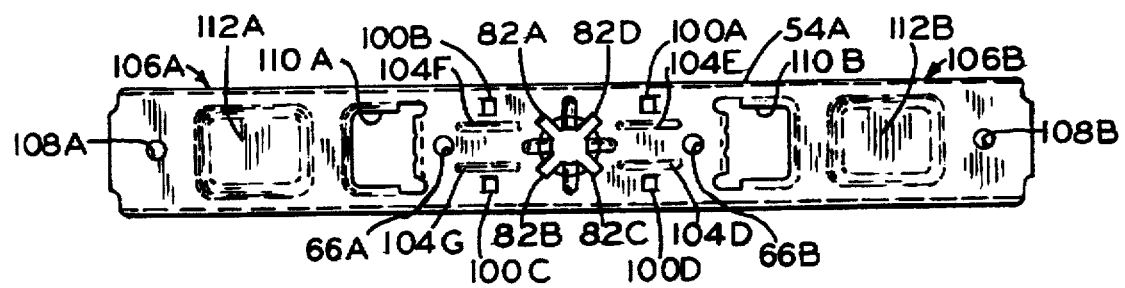
FIG_4
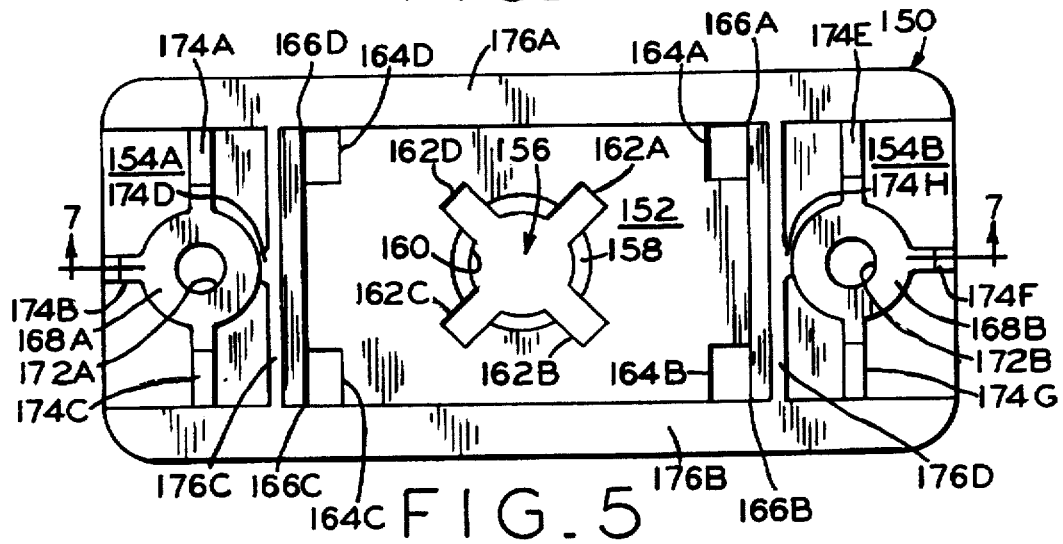
FIG_5
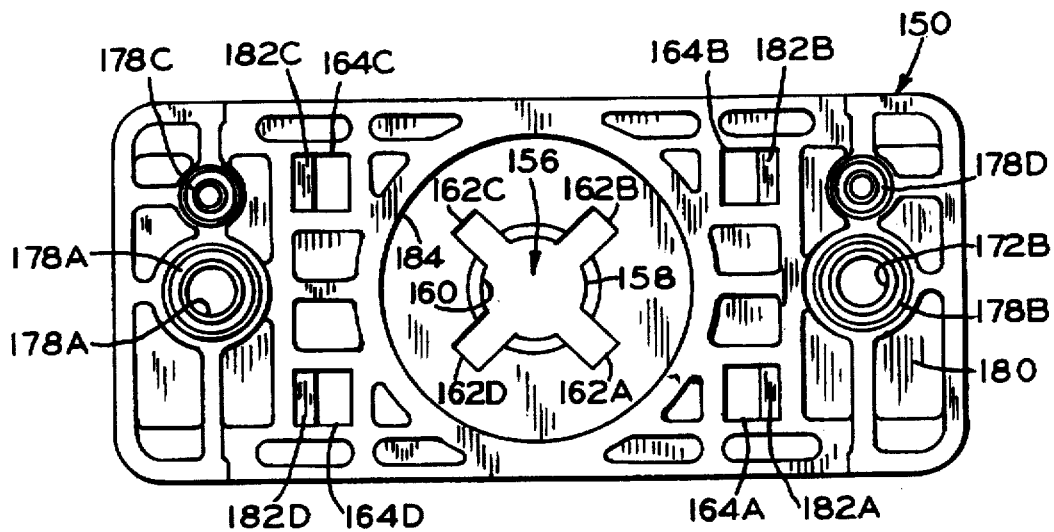
FIG_6

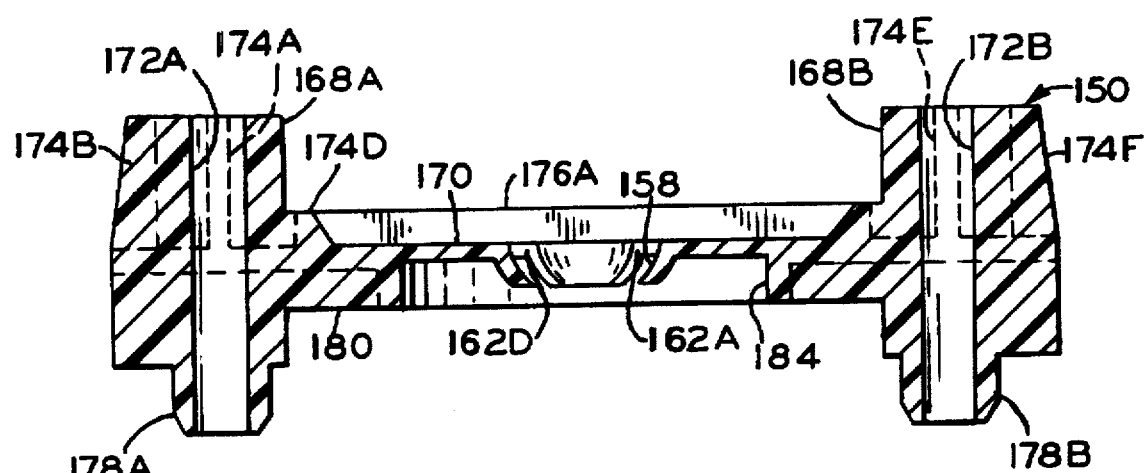
FIG_7

5,710,468

END FRAME ASSEMBLY

FIELD OF THE INVENTION

The present invention relates generally to electric motors, and more specifically, to an end frame assembly for use with electric motors.

BACKGROUND OF THE INVENTION

Known electric motors generally include an endshield which forms a partial housing for a rotor bearing and an oil wick. Such known endshields may be secured to the motor stator using an epoxy. Specifically, with known endshields, the bearing and oil wick are positioned in the partial housing of the endshield and a retention spring may hold the bearing and oil wick in place. Such an assembly is sometimes referred to herein as an end frame assembly. The endshield, with the assembled bearing, oil wick and retention spring, may be secured to the motor stator by an epoxy applied at the interface between the motor stator and the endshield. The epoxy is cured so that the epoxy hardens and maintains the endshield in position.

Assembly of the endshield, the bearing, the oil wick, and the retention spring typically is performed by a human operator. Known automation equipment is not capable of assembling such components which must have specific orientations with very little tolerance. Requiring human operators to perform such assembly, of course, increases the manufacturing costs and assembly time. Also, the time required for the epoxy to cure generally is at least one hour, and the ovens used to cure the epoxy consume a large amount of energy. Such a long cure time and high energy consumption further increase the overall manufacture costs.

After the motor is assembled, the motor generally is shipped from the manufacturing site to, for example, a warehouse. During the shipping process, the motor undergoes some vibrations. The engagement between the motor endshield and the motor stator must withstand such vibrations so that the endshield does not become separated from the stator. In addition, and although the engagement between the motor endshield and the motor stator must be sufficiently secure to withstand such vibrations, it is preferable to be able to remove the motor endshield from the motor stator so that parts, e.g., the bearing and oil wick, can be replaced or repaired.

The epoxy bond between the endshield and motor stator described above can withstand normal vibrations. The epoxy, however, is difficult to remove and prevents removing the endshield from the stator to repair or replace parts. Thus, a motor with a worn bearing or depleted oil wick typically is discarded.

Accordingly, is it desirable and advantageous to provide a motor end frame assembly which can be fully assembled using known automation equipment and secured to a motor stator without the use of epoxy. It is also desirable and advantageous to provide such a motor end frame assembly which can be securely engaged to a motor stator so as to withstand normal external conditions, e.g., vibrations, yet be disassembled from the motor stator so that components can be repaired or replaced.

An object of the present invention is to provide a motor end frame assembly which can be assembled and engaged to a motor stator using known automation equipment.

Another object of the present invention is to provide a motor endshield which can be securely engaged to a motor stator so as to withstand normal external conditions.

Still another object of the present invention is to provide such a motor endshield which can be disassembled from a motor stator so end frame assembly components can be repaired or replaced.

Yet another object of the present invention is to provide a motor end frame assembly having components which are inexpensive to manufacture and which can be quickly engaged to a motor stator without requiring an extended curing process in a high energy consumption oven.

SUMMARY OF THE INVENTION

These and other objects are attained by a motor end frame assembly which includes, in one embodiment, an endshield, a bearing, an oil wick, and an oil well cover. The endshield has a substantially planar, rectangular central section and two end sections. A rotor shaft opening is formed in the central section of the endshield. A bearing seat is formed at, and defines, the outer periphery of the rotor shaft opening. An oil well cover tang opening is formed at each corner of the rectangular-shaped central section of the endshield.

Each end section of the endshield includes alignment bosses which extend from a first surface of the endshield. The first surface is configured for being placed adjacent the stator core. The alignment bosses are configured to be inserted into openings formed in the stator core. Each endshield end section also includes a support boss which extends from a second surface of the endshield. When the endshield is secured to a motor stator, the second surface faces outward from the stator core. Each support boss is coaxially aligned with one of the alignment bosses, and an opening extends through such aligned bosses. The opening is sized to receive a threaded bolt.

The assembly bearing, in one embodiment, is a porous sleeve type bearing having opposing ends sections. Each end section is sized to seat within the bearing seat of the motor endshield. The oil wick may have a generally rectangular shape with a central bearing opening sized to have at least a portion of the bearing inserted within the opening so that surfaces of the bearing are in direct contact with the oil wick. The oil wick typically is saturated with a bearing lubricant.

The oil well cover also may have a generally rectangular shape. An endshield engagement tang extends from each corner of the cover and each such tang aligns with and can be secured within the oil well cover engagement openings in the endshield. The oil well cover also includes a plurality of bearing alignment fingers for assisting in maintaining the bearing oriented in position with respect to the bearing seat of the endshield. A rotor shaft opening is formed in the oil well cover.

With respect to assembling the endshield, bearing, wick, and oil well cover, one end section of the bearing is placed in the bearing seat of the endshield, and the oil wick is positioned so that a portion of the bearing is located within the bearing opening of the wick. The oil well cover is then aligned with the endshield by aligning the oil well cover tangs with the tang openings in the endshield and forcing the tangs through the respective aligned openings so that the tangs form a "snap fit" with the endshield. The oil well cover and endshield, when so assembled, form a substantial enclosure for the oil wick and bearing.

The assembly is then secured to a motor stator by inserting the alignment bosses extending from the first surface of the endshield into openings in the stator core. Threaded bolts are then passed through the support bosses, which extend from the second surface of the endshield, and the respective alignment bosses and into the openings in the stator core.

The threaded bolts pass through the stator core and into the alignment bosses of an endshield of another end frame assembly positioned on the opposing side of the stator core.

The end frame assemblies are secured to the stator core so that the respective rotor shaft openings of each endshield, bearing and oil well cover coaxially align with a rotor shaft which extends from a rotor positioned in the rotor bore of the stator core. The rotor is supported within the rotor bore by the end frame assemblies.

The motor endshield may be formed or molded, for example, from thermoplastic. Use of such materials reduces the overall cost of the motor endshield as compared to known endshields which are formed, for example, from zinc using a zinc die casting process. In addition, by securing the motor endshield to the motor stator using threaded bolts rather than an epoxy process, the motor endshield can easily be removed from the motor stator to repair or replace parts of the end frame assembly. Rather than discarding a complete motor with a worn bearing, therefore, the worn bearing can easily be replaced and the motor can be put back in service.

Further, the components of the motor end frame assembly can be assembled and secured to the motor stator core using known and commercially available automation equipment. The endshield, bearing, oil wick and oil well cover have sufficiently large tolerances so that known automation equipment can be used to assemble such components and to then engage the assembly to a stator core. Further, the time consuming and high energy consumption epoxy application and curing processes are totally eliminated. As compared to such epoxy processes, securing the above described end frame assembly to a stator is inexpensive and can be performed much faster.

BRIEF DESCRIPTION OF THE DRAWINGS

FIG. 1 is a perspective plan view of a prior art electric motor including known, epoxy secured, endshields.

FIG. 2 is an elevation view of an electric motor having end frame assemblies which include aluminum endshields and thermoplastic oil well covers.

FIG. 3 is an exploded view of one end frame assembly illustrated in FIG. 2.

FIG. 4 is a top plan view of an extended endshield configured to mount to a support bracket.

FIG. 5 is a top plan view of a thermoplastic endshield.

FIG. 6 is a bottom plan view of the endshield illustrated in FIG. 5.

FIG. 7 is a cross-section view taken along line 7—7 in FIG. 5.

DETAILED DESCRIPTION OF THE DRAWINGS

FIG. 1 is a perspective view of an electric motor 10 including known endshields 12A and 12B. Endshields 12A and 12B are identical and are formed, for example, from aluminum. Motor 10 also includes a stator core 14 and bobbin winding 16. Bobbin winding 16 is carried by a leg 18 of stator core which interconnects first and second legs 20A and 20B of core 14. A rotor 22, which is supported by shaft 24, is positioned within the rotor bore of stator core 14.

Oil well covers 26A and 26B are secured to endshields 12A and 12B, respectively. Oil well cover 26A forms an enclosure with endshield 12A for an oil wick and bearing (not shown). Boss 28A extends from oil well cover 26A. An opening 30A is formed in boss 28A, and shaft 24 extends through such opening 30A. Rotor shaft 24, however, may not extend completely through boss 28B (not visible in FIG. 1) which extends from cover 26B. Cover 26A is secured to endshield 12A by L-shaped cover extensions 32A which mate with slots 34 formed in endshield 12A.

Endshields 12A and 12B are secured to stator core 14 by an epoxy 36A and 36B. More particularly, during the assembly process, endshields 12A and 12B are aligned with stator core 14 and rotor 22 as described above. Then, epoxy 36A–B is applied at the interfaces between endshields 12A and 12B and stator core 14. The epoxy is cured so that it hardens and maintains endshields 12A and 12B in the desired position relative to stator core 14.

As described above, curing epoxy 36A and 36B to form the epoxy bond between endshields 12A and 12B and stator core 14 is a time consuming and expensive process. In addition, if it becomes desirable to remove one or both endshields 12A and 12B from stator core 14, epoxy 36A and 36B generally prevents such removal.

FIG. 2 is an elevation view of an electric motor 50 which overcomes these and other shortcomings of motor 10 having known endshields 12A–B. Motor 50 includes a stator core 14, a bobbin winding 16, and a rotor 22. End frame assemblies 52A and 52B, which may sometimes be referred to herein as endshield assemblies, are secured to motor 50 and are identical. Therefore, the following detailed description of assembly 52A also describes assembly 52B.

Particularly, end frame assembly 52A includes an endshield 54A. An oil well cover 56A is secured to endshield 54A. A boss 58A extends from a substantially planar surface 60A of cover 56A. An opening 62A extends through boss 58A, and rotor shaft 24 is illustrated as extending through such opening 62A. Bosses 58A–B (only boss 58A is visible in FIG. 2) are utilized in mounting motor 50 in a well known manner.

With respect to endshield 54A, a plurality of alignment extensions or teeth 64A–F (tooth 64F is not visible in FIG. 2) extend into stator core 14. More particularly, slots (not shown) formed in stator core 14 align with teeth 64A–F. Openings (not shown) also are formed in stator core 14 which align with openings 66A–B in endshield 54B. Threaded bolts 68A–B are inserted through such aligned openings, extend through stator core 14, and are threadedly engaged to endshield 54B in similar aligned openings in such endshield 54B. Endshield 54A also includes four ground tabs 70A–D. Such ground tabs 70A–D are utilized to electrically ground endshield 54A.

FIG. 3 is an exploded perspective view of end frame assembly 52A. Specifically, and as described above, assembly 52A includes an endshield 54A and an oil well cover 56A. Assembly 52A also includes a bearing 72A and an oil wick 74A. With respect to endshield 54A, such endshield 54A is stamped and formed from an aluminum sheet. A bearing seat 76A is integrally formed with endshield 54A adjacent rotor shaft opening 76B. Bearing seat 76A is formed by stamping four sections 78A–D from a substantially planar surface 80 of endshield 54A adjacent sections 78A–D. Four alignment finger openings or slots 82A–D also are stamped into planar surface 80 of endshield 54A. Such slots 82A–D cooperate with cover 56A as hereinafter described to maintain bearing 72A in proper alignment. Slots 82A–D of slot pair 82A and 82C and slot pair 82B and 82D are diametrically opposed, and such slots 82A–D are contiguous with and extend radially from rotor shaft opening 76B.

Bearing 72A is a porous sleeve type bearing. An opening 84 extends coaxially through bearing 72A. Both ends 86A-B of bearing 72A are configured to seat within bearing seat 76A of endshield 54A. Of course, only one end 86A actually seats in bearing seat 76A, but either end 86A-B could be oriented to seat within bearing seat 76A.

Oil wick 74A includes a bearing opening 88 sized to receive at least a portion of bearing 72A and to contact at least a portion of side surfaces of such bearing 72A. Four slots 90A-D are formed in oil wick 74A and align with slots 82A-D formed in endshield 54A.

Oil well cover 56A has a substantially rectangular shape and includes four tangs 92A-B which extend from each corner of cover 56A. Cover 56A forms a partial enclosure 94 which, as hereinafter explained in more detail, partially encloses oil wick 74A and bearing 72A. Four bearing alignment fingers 96A-D extend from an interior planar surface 98 of oil well cover 56A. Fingers 96A-D of finger pair 96A and 96C and finger pair 96B and 96D are diametrically opposed, and such fingers 96A-D are radially spaced around rotor shaft opening 62A. Fingers 96A-D are sized so as to be in contact with a portion of bearing 72A.

As described above, endshield 54A is stamped from a sheet of aluminum. The aluminum blank may, for example, be about 0.042-0.038 inches thick. Beating seat 76A and slots 82A-D may be formed using a punch press operation and utilizing a die configured to enable sections 78A-D to be folded, or bent, to form seat 76A. Teeth 64A-F are formed from the stamped blank, and such teeth 64A-F are folded to about a 90° angle relative to the substantially planar blank. The specific dimensions of bearing seat 76A and teeth 64A-F depend, for example, on the specific motor stator core, rotor and rotor bearing to be utilized in connection with endshield 54A.

Bearing 72A may, for example, be a porous sleeve type bearing or some other type of bearing. Oil wick 74A may be formed from many materials, such as wool. In one embodiment, wick 74A has at least a 50% wool content. Oil well cover 56A is molded, for example, from Valox® plastic (15% PBT Polyester), which is commercially available from General Electric Company, Pittsfield, Mass.

With respect to assembly of the components of end frame assembly 52A, one end 86A of bearing 72A is placed within seat 76A of endshield 54A. Oil wick 74A is then placed on endshield 54A so that at least a portion of bearing 72A is within opening 88. Lubricant stored within wick 74A can then be transferred to the outer surface of bearing 72A. Since such beating 72A is porous, the lubricant passes through such bearing 72A, by capillary action, to its inner diameter surface.

Oil well cover 56A is then aligned with endshield 54A so that tangs 92A-D align with endshield tang openings 100A-D and so that bearing alignment fingers 96A-D align with wick slots 90A-D and endshield slots 82A-D. Cover tangs 92A-D are then forced through openings 100A-D so that such tangs 92A-D momentarily deflect inward. Once fully inserted, tangs 92A-D snap outward so that edge surfaces 102A-D of tangs 92A-D, respectively, are in substantial surface-to-surface contact with surface 80 of endshield 54A. A plurality of stiffening ribs 104A-J are formed on endshield 54A to provide extra support for assembly 52A. When fully assembled as described above, at least a portion of bearing 72A and oil wick 74A are located within partial enclosure 94 of cover 56A.

FIG. 4 illustrates endshield 54A modified to include integral extensions 106A-B. Each extension 106A-B includes openings 108A-B, respectively, which align with a mounting bracket (not shown). Cut-outs 110A-B result from formation of teeth portions 64A-F. Formed sections 112A-B are provided to increase the stiffness of extensions 106A-B, respectively. Extensions 106A-B can be utilized to provide an alternative to mounting motor 50 using bosses 58A-B, as is known in the art.

End frame assemblies 52A and 52B can be fully assembled using known and commercially available automation equipment and are secured to motor stator core 14 without the use of epoxy. Such assemblies 52A and 52B also are securely engaged to stator core 14 so as to withstand normal external conditions e.g., vibrations, yet can be disassembled from core 14 so that components, e.g., bearing 72A or wick 74A, can be repaired or replaced.

Another embodiment of an endshield 150 is illustrated in FIG. 5. Specifically, FIG. 5 is a top plan view of endshield 150 which has a substantially planar, rectangular central section 152 and two end sections 154A-B. A rotor shaft opening 156 is formed in central section 152 of endshield 150, and a bearing seat 158 is formed at, and defines, outer periphery 160 of rotor shaft opening 156. Four finger alignment slots 162A-D having open ends at periphery 160 of opening 156 also are provided. Oil well cover tang openings 164A-D are formed at each corner 166A-D of central section 152 of endshield 150.

Each end section 154A-B of endshield 150 includes support bosses 168A-B which extend from a first surface 170 to endshield 150. First surface 170 faces outward from a stator when assembled to a stator core (not shown in FIG. 5). Engagement bolt openings 172A-B are formed in support bosses 168A-B respectively and, as explained hereinafter, are utilized for engaging endshield 150 to a motor stator (not shown). Support bars 174A-H provide extra support for bosses 168A-B and rigidity bars 176A-D add extra rigidity support for endshield 150.

A bottom plan view of endshield 150 is illustrated in FIG. 6. As shown in FIG. 6, four alignment extensions or bosses 178A-D extend from a second surface 180 of endshield 150. Bosses 178A-D have a plurality of tapers to facilitate insertion of such bosses 178A-D into respective openings in the stator core. Bosses 178A-B align with bosses 168A-B, respectively, and openings 172A-B extend through bosses 178A-B, respectively.

With respect to tang openings 164A-D, tang engagement surfaces 182A-D are formed adjacent such openings 164A-D to make substantial surface to surface contact with tang surfaces 102A-D of oil well cover tangs 92A-D (FIG. 3). The general honeycomb structure of surface 180 of endshield 150 provides additional rigidity and support for such endshield 150. A flat, circular shaped area 184 is formed in second surface 180 and is coaxial with rotor shaft opening 156. Such area 184 provides extra clearance, and cooling, for a rotor when endshield 150 is secured to a stator core.

FIG. 7 is a side view of endshield 150 through line 7—7 of FIG. 5 and illustrates some of the relative elevations of different sections of endshield 150. For example, as clearly shown in FIG. 7, bosses 174A-B extend from first surface 170 and bosses 178A-B extend from second surface 180. Openings 172A-B extend through such respective aligned bosses 168A and 178A and aligned bosses 168B and 178B.

Endshield 150 can be molded, for example, from a thermoplastic material such as Valox DR51 plastic which is commercially available from General Electric Company, Pittsfield, Mass. Using such thermoplastic, endshield 150 is made, for example, using an injection molding process. Endshield 150 is relatively inexpensive to manufacture, particularly as compared to manufacturing costs associated with die casting known zinc endshields.

Bearing 72A, oil wick 74A and cover 56A illustrated in FIG. 3 can be assembled with endshield 150 in the same manner as with endshield 54A. Particularly, one end 86A of bearing 72A is placed in bearing seat 158, and oil wick 74A is positioned so that a portion of bearing 72A is located within bearing opening 88 of wick 74A. Oil well cover 56A is then engaged to endshield 150 by aligning oil well cover tangs 92A–D with tang openings 164A–D in endshield 150 and forcing tangs 92A–D through respective aligned openings 164A–D so that surfaces 102A–D of tangs 92A–D are in substantial surface to surface contact with surfaces 182A–D of endshield 150. In this manner, a snap fit is formed between cover 56A and endshield 150. Oil well cover 56A and endshield 150, when so assembled, form a substantial enclosure for oil wick 74A and bearing 72A.

Such assembly is then secured to a motor stator by inserting alignment bosses 178A–D into openings formed in the stator core. Threaded bolts are then passed through openings 172A–B and into openings in the stator core. Such bolts are passed through the core and into openings 172A–B in another endshield 150 positioned on the opposing side of the stator core. Such assemblies are secured to the stator core so that respective rotor shaft openings 156 of each endshield 150, bearing 172A and oil well cover 56A coaxially align with a rotor shaft which extends from a rotor positioned in the rotor bore of the stator core. The rotor is supported within the rotor bore by the endshield assemblies. As with endshield 54A described above, by securing endshield 150 to the motor stator using threaded bolts rather than an epoxy process, endshield 150 can easily be removed from the motor stator to repair or replace parts of the endshield assembly. In addition, the components of the motor endshield assembly can be assembled and secured to endshield 150 using known and commercially available automation equipment. Further, the time consuming and high energy consumption epoxy application and curing processes are totally eliminated.

From the preceding description of several embodiments of the present invention, it is evident that the objects of the invention are attained. Although the invention has been described and illustrated in detail, it is to be clearly understood that the same is intended by way of illustration and example only and is not to be taken by way of limitation.

For example, the particular shape and materials of construction for each component of the end frame assembly may vary from the shapes and materials described herein. Also, rather than having threaded bolts pass through the stator core and threadedly engage another endshield, the threaded bolts could extend into the stator core, and the threads of the bolts and the laminations could engage and cooperate to secure the endshield to the stator core. Accordingly, the spirit and scope of the invention are to be limited only by the terms of the appended claims.

What is claimed is:

1. An end frame assembly for an electric motor, the motor comprising a stator having a rotor bore and a rotor positioned within the rotor bore, the rotor having a shaft extending therefrom, said assembly comprising:

an endshield comprising a rotor shaft opening formed therein, said endshield further comprising at least one oil well cover engagement opening and at least one stator core engagement opening;

a bearing comprising a rotor shaft opening therein, said bearing configured to be aligned with the rotor shaft opening formed in said endshield;

an oil wick comprising a bearing opening sized to at least partially receive said bearing;

an oil well cover comprising at least, one endshield engagement tang for aligning with and being secured within the oil well cover engagement opening in said endshield, a rotor shaft opening, and a plurality of bearing alignment fingers radially spaced around the rotor shaft opening in said oil well cover for assisting in maintaining said bearing oriented in a desired position with respect to the rotor shaft; and said endshield further comprising a bearing seat for assisting in maintaining said bearing oriented with respect to the rotor shaft and a plurality of bearing alignment finger openings, each of the fingers openings being configured to align with one of said bearing alignment fingers of said oil well cover and to have a portion of said finger pass therethrough.

2. An end frame assembly in accordance with claim 1 wherein two pairs of diametrically opposed finger openings are formed in said endshield, the openings being contiguous with and extending radially from the rotor shaft opening.

3. An end frame assembly in accordance with claim 1 wherein said oil well cover further comprises a partial enclosure, and said oil well cover partial enclosure and said endshield substantial enclose said oil wick and said bearing when fully assembled.

4. An end frame assembly in accordance with claim 3 wherein said oil well cover partial enclosure has a substantially rectangular shape and said oil well cover further comprises four endshield engagement tangs, one of said tangs extending from each corner of said oil well cover partial enclosure.

5. An end frame assembly in accordance with claim 4 wherein said oil well cover further comprises two pairs of diametrically opposed bearing alignment fingers, said bearing alignment fingers being equally and radially spaced around the rotor shaft opening formed in said oil well cover.

6. An end frame assembly in accordance with claim 1 wherein said oil well cover further comprises an extended boss aligned with and extending from the rotor shaft opening of said oil well cover.

7. An end frame assembly in accordance with claim 1 wherein said endshield is substantially rectangular shaped and further comprises two stator core engagement openings formed therein, said engagement openings being formed at opposing sides of the rotor shaft opening formed in said endshield.

8. An end frame assembly in accordance with claim 1 wherein said endshield further comprises four oil well cover engagement openings configured for receiving said endshield engagement tangs of said oil well cover.

9. An end frame assembly in accordance with claim 1 wherein said endshield further comprises a plurality of alignment extensions extending from said endshield for facilitating maintaining alignment between said endshield and the motor stator.

10. An end frame assembly in accordance with claim 9 wherein said endshield is formed of thermoplastic and said alignment extensions comprise a plurality of alignment bosses configured to extend into alignment openings in the motor stator.

11. An end frame assembly in accordance with claim 10 wherein said endshield further comprises a plurality of support bosses extending from each stator core engagement opening and a plurality of rigidity members.

12. An end frame assembly in accordance with claim 9 wherein said endshield is formed of aluminum and said extensions comprise a plurality of teeth configured to extend into slots in the motor stator.

13. An end frame assembly in accordance with claim 12 wherein said endshield further comprises ground tabs.

14. An end frame assembly in accordance with claim 1 wherein said bearing is a porous sleeve bearing.

15. An end frame assembly in accordance with claim 1 wherein said oil wick has a substantially rectangular shape and wherein two pairs of diametrically opposed finger openings are formed therein, the finger openings being contiguous with and extending radially from the bearing opening formed through said wick.

16. A method of assembling an end frame assembly for an electric motor, the motor comprising a stator having a rotor bore and a rotor positioned within the rotor bore, the rotor having a rotor shaft extending from at least one end thereof, the end frame assembly comprising an endshield having a bearing seat, a bearing, an oil wick, and an oil well cover, the oil well cover including a rotor shaft opening and a plurality of bearing alignment fingers radially spaced around the rotor shaft opening, the oil well cover further including a plurality of endshield engagement tangs and the endshield having a plurality of tang openings, said method comprising the steps of:

positioning the bearing on the bearing seat of the endshield so that rotor shaft openings in the bearing and endshield are substantially coaxially aligned;

placing the oil wick on the endshield so that the bearing is at least partially within a bearing opening in the oil wick; and engaging the oil well cover to the endshield so that the oil well cover and the endshield substantially enclose the bearing and the oil wick and so that the bearing alignment fingers of the oil well cover extend at least partially through the oil wick and into contact with the bearing so that the bearing alignment fingers and the bearing seat of the endshield cooperate to orient the bearing, engaging the oil well cover to the endshield comprising the steps of:

aligning each engagement tang of the oil well cover with one of the tang opening in the endshield; and forcing each tang through the respective aligned tang opening in the endshield so that each tang snaps into engagement with the endshield.

17. A method in accordance with claim 16 wherein the endshield has a plurality of alignment extensions which mate with alignment openings formed in the stator core, and said method further comprises the steps of:

inserting each alignment extension of the endshield into one of the respective alignment openings in the stator core; and securing the endshield to the stator core.

18. A method in accordance with claim 17 wherein the rotor shaft extends through the endshield and bearing and at least partially through the oil well cover.

19. A method in accordance with claim 16 further comprising the step of securing the end frame assembly to the motor stator using at least one threaded bolt.

20. An endshield comprising a plurality of alignment extensions configured for mating with a stator core, said endshield having a rotor shaft opening, at least one oil well cover engagement opening and at least one stator core engagement opening, said endshield further comprising a bearing seat and at least one pair of diametrically opposed finger openings, the finger openings being contiguous with and extending radially from the rotor shaft opening and sized to receive at least a portion of respective bearing alignment fingers of the oil well cover.

21. An endshield in accordance with claim 20 wherein said endshield is substantially rectangular shaped and two stator core engagement openings are formed therein, said engagement openings being formed at opposing sides of the rotor shaft opening.

22. An endshield in accordance with claim 20 wherein four oil well cover engagement openings are formed in said endshield.

23. An endshield in accordance with claim 20 wherein said endshield is formed of thermoplastic and said alignment extensions comprise a plurality of alignment bosses.

24. An endshield in accordance with claim 23 wherein said endshield further comprises a plurality of support bosses extending from each stator core engagement opening and a plurality of rigidity members.

25. An endshield in accordance with claim 20 wherein said endshield is formed of aluminum and said extensions comprise a plurality of teeth configured to extend into slots in the motor stator.

26. An oil well cover for coupling to an endshield having at least one engagement opening and a plurality of finger slots, said cover comprising at least one endshield engagement tang for aligning with and being secured within the oil well cover engagement opening, a rotor shaft opening, and a plurality of bearing alignment fingers radially spaced around said rotor shaft opening for being at least partially inserted within respective finger slot.

27. An oil well cover in accordance with claim 26 further comprising a partial enclosure, and said oil well cover partial enclosure and the endshield substantially enclosing an oil wick and a bearing when fully assembled.

28. An oil well cover in accordance with claim 26 having a substantially rectangular shape and comprising four endshield engagement tangs, one of said tangs extending from each corner of said cover.

29. An oil well cover in accordance with claim 26 comprising two pairs of diametrically opposed bearing alignment fingers, said bearing alignment fingers being equally and radially spaced around the rotor shaft opening formed in said oil well cover.

30. An oil well cover in accordance with claim 26 further comprising an extended boss aligned with and extending from the rotor shaft opening.

31. An oil well cover in accordance with claim 26 wherein said oil well cover is formed of thermoplastic.

32. A motor comprising a stator having a rotor bore, a rotor having a rotor shaft, and at least one end frame assembly that carries a bearing and supports said rotor in the rotor bore of said stator, said end frame assembly comprising an endshield including a rotor shaft opening, said endshield further including at least one oil well cover engagement opening and at least one stator core engagement opening, said end frame assembly further comprising a bearing having a rotor shaft opening therein and an oil wick, said bearing configured to be aligned with the rotor shaft opening in said endshield and said oil wick having a bearing opening, the bearing opening in said oil wick sized to at least partially receive said bearing, said end frame assembly further comprising an oil well cover having at least one endshield engagement tang for aligning with and being secured within the oil well cover engagement opening in said endshield, a rotor shaft opening, and a plurality of bearing alignment fingers radially spaced around the rotor shaft opening for assisting in maintaining said bearing oriented in a desired position with respect to said rotor shaft said endshield further comprising a bearing seat for assisting in maintaining said bearing oriented with respect to said rotor shaft and a plurality of bearing alignment finger openings, each of the finger openings being configured to align with one of said bearing alignment fingers of said oil well cover and to have a portion of said finger pass therethrough.

33. A motor in accordance with claim 32 wherein said endshield further comprises a plurality of alignment extensions extending from said endshield for facilitating maintaining alignment between said endshield and said stator.

34. A motor in accordance with claim 33 wherein said endshield is formed of thermoplastic and said alignment extensions comprise a plurality of alignment bosses configured to extend into alignment openings in said stator.

35. A motor in accordance with claim 33 wherein said endshield is formed of aluminum and said extensions comprise a plurality of teeth configured to extend into slots in the motor stator.

36. A motor in accordance with claim 33 wherein said bearing is a porous sleeve bearing.

37. A motor in accordance with claim 33 wherein said oil wick has a substantially rectangular shape and wherein two pairs of diametrically opposed finger openings are formed therein, the finger openings being contiguous with and extending radially from the bearing opening formed through said wick.

* * * * *